Patented Nov. 17, 1936

2,060,880

UNITED STATES PATENT OFFICE 2,060,880

PROCESS OF PRODUCING ETHYLENE GLYCOL

Wilbur A. Lazier, Marshallton, Del., assignor to E. I. du Pont de Nemours & Company, Wilmington, Del., a corporation of Delaware No Drawing. Application September 23, 1933, Serial No. 690,771

10 Claims. (Cl. 260—156.5)

This invention relates to a process for the catalytic hydrogenation of the alkyl esters of oxalic acid to produce the corresponding glycol. More specifically it relates to a process for the catalytic hydrogenation of the diethyl ester of oxalic acid to produce ethylene glycol.

It is an object of this invention to provide a process for the preparation of ethylene glycol by the catalytic hydrogenation of a di-alkyl oxalate. A more specific object is to provide a process of hydrogenating diethyl oxalate to obtain ethylene glycol. Other objects of this invention will appear hereinafter.

Recent investigation has led to the discovery of particularly favorable conditions for the hydrogenation of alkyl oxalates, which heretofore have not been practised. By means of this invention it is possible to obtain excellent yields of ethylene glycol. This is accomplished by a method which in a general way comprises the treatment of an alkyl oxalate in the presence of a hydrogenating catalyst and an excess of hydrogen at elevated temperature and pressure.

The following examples are given by way of illustration and are not intended to be construed as limiting the scope of the invention.

Example 1

A series of hydrogenations was carried out at various pressures. In every case an autoclave equipped for agitation was charged with 150 g. of diethyl oxalate and 12 g. of copper chromite catalyst. Agitation was maintained throughout the runs, and the autoclave was heated to 240° C. The reaction was exothermic, and the temperature rose at times somewhat above 240° C. but not above 260° C. The hydrogen pressure was maintained at the values shown in the table. The progress of the reaction was observed by noting the pressure drop, which necessitated the addition of hydrogen to maintain the desired pressure. The yield of ethylene glycol was determined by analyzing the crude product for residual ester and by isolation of the glycol by distillation.

| Hydrogen pressure in atmospheres | Time in hours | Percent ester hydrogenated | Percent ethylene glycol recovered |
|---|---|---|---|
| 200 | 2.0 | 70 | 15–20 |
| 450 | 1.25 | 88 | 65–70 |
| 600 | 1.25 | 99 | 80–85 |
| 1000 | 1.0 | 99 | 85 |

It will be apparent from the above table that the yield of glycol is influenced profoundly by the pressure. At 200 atmospheres, although 70% of the ester is hydrogenated, the yield of glycol is but 20%, indicating that a relatively high percentage of other products such as ethanol, ether, etc. is formed at this pressure. At pressures of 600–1000 atmospheres, 99% of the ester is hydrogenated with an 80–85% yield of glycol.

The copper chromite catalyst employed in the above hydrogenation was prepared as follows: 1500 grams of copper nitrate was dissolved in 4 liters of water and mixed with a solution containing 1000 g. of ammonium chromate in an equal volume of water. Ammonium hydroxide was added to neutralize the acidity developed during precipitation of the copper ammonium chromate. The precipitate was washed by decantation, filtered and dried, after which it was ignited at 400° C. The resulting copper chromite powder was used for hydrogenation without further treatment.

In the above example hydrogen pressures varying from 200 atmospheres to 1000 atmospheres were used but the preferred pressure is 400 atmospheres or more. The upper limit of pressure which is satisfactory may be as high as the reaction vessel will withstand.

The preferred temperature range for hydrogenation is 200–275° C. but the invention is not to be limited to these specific values as temperatures as high as 300° C. may be suitable under certain circumstances.

The preferred catalyst for the process of this invention is copper chromite which is described in the example. Catalysts that are adaptable to the applicant's process are those that may be classified as consisting of a hydrogenating metal or its oxide promoted by the presence of a more acidic metal oxide, especially where the more acidic metal oxide is chromium oxide. Any hydrogenating catalyst, however, may be used but the success of the reaction will be greatly reduced by inferior catalysts.

Other esters of oxalic acid than diethyl oxalate may be hydrogenated by the process of this invention. The preferred esters are those of alcohols higher than methanol, which are substantially immiscible with water, but methyl oxalate will yield ethylene glycol in smaller quantities. These alcohols include butyl, amyl, hexyl, octyl, decyl, dodecyl, tetradecyl, cetyl, ricinoleyl, octadecyl, 9,10-octadecenyl and the branched chain alcohols containing 4 or more carbon atoms and produced, for example, in the methanol synthesis.

The chief advantage of this invention resides in the high yields of ethylene glycol which are obtained from the hydrogenation of diethyl oxalate. By the process of this invention it may be possible to produce ethylene glycol more economically, and so increase the already large use of this important organic chemical compound.

The above description and specific examples are given by way of illustration only and are not to be construed as limiting the scope of the invention.

I claim:—

1. In the process of producing ethylene glycol, the step which comprises catalytically hydrogenating a di-alkyl ester of oxalic acid at a pressure in excess of 200 atmospheres.

2. The process of claim 1, characterized in that the pressure is above 400 atmospheres.

3. The process of claim 1, characterized in that the pressure is above 400 atmospheres and the temperature is 200–275° C.

4. The process of claim 1, characterized in that an excess of hydrogen is used.

5. In the process of producing ethylene glycol, the step which comprises catalytically hydrogenating a di-alkyl ester of oxalic acid at a pressure in excess of 200 atmospheres, the hydrogenation being carried out in the presence of a catalyst that is a member of the class consisting of the hydrogenating metals and their oxides promoted by the presence of an acidic metal oxide.

6. In the process of producing ethylene glycol, the step which comprises catalytically hydrogenating a di-alkyl ester of oxalic acid at a pressure in excess of 200 atmospheres, the hydrogenation being carried out in the presence of a catalyst that is a member of the class consisting of the hydrogenating metals and their oxides promoted by the presence of chromium oxide.

7. The process of claim 1, characterized in that the alkyl ester is a diethyl ester.

8. The process which comprises reacting hydrogen and the diethyl ester of oxalic acid at a temperature of 200–275° C. and a pressure in excess of 400 atmospheres in the presence of a copper chromite catalyst.

9. The process which comprises reacting hydrogen and the diethyl ester of oxalic acid at a temperature of about 240° to 260° C. and at a pressure in excess of 600 atmospheres in the presence of a catalyst consisting of copper chromite.

10. In the process of producing ethylene glycol, the step which comprises catalytically hydrogenating a di-alkyl ester of oxalic acid at a pressure in excess of 200 atmospheres, the hydrogenation being carried out in the presence of a copper-containing hydrogenating catalyst.

WILBUR A. LAZIER.